United States Patent [19]
Ambs

[11] Patent Number: 6,002,648
[45] Date of Patent: Dec. 14, 1999

[54] SLOTTED CYLINDER MARINE SIESMIC METHOD AND SOURCE

[75] Inventor: Loran D. Ambs, Fulshear, Tex.

[73] Assignee: Western Atlas International, Inc., Houston, Tex.

[21] Appl. No.: 09/174,133

[22] Filed: Oct. 16, 1998

[51] Int. Cl.$^6$ ....................................................... G01V 1/04
[52] U.S. Cl. ........................... 367/159; 367/162; 181/170
[58] Field of Search ..................................... 367/155, 157, 367/158, 163, 165, 159, 162, 169; 181/113, 120

[56] References Cited

U.S. PATENT DOCUMENTS 4,153,135  5/1979  Bouyoucos ............................... 181/120
5,267,223  11/1993  Flannagan et al. ..................... 367/159

*Primary Examiner*—Christine K Oda
*Assistant Examiner*—Anthony Jolly
*Attorney, Agent, or Firm*—Alan J. Atkinson

[57] ABSTRACT

A seismic method and system for generating seismic source energy in marine geophysical operations. A slotted housing is moveable by the actuation of piezoelectric elements to generate high power, low frequency seismic source signals. When the piezoelectric elements are activated by electric power, displacement of such elements is enlarged by the slotted housing to generate a pressure pulse in the water. The invention permits single source pressure pulse generation having sufficient power and low frequency. The housing can be towed by a seismic vessel or can be integrated into a self-contained marine vehicle.

17 Claims, 2 Drawing Sheets

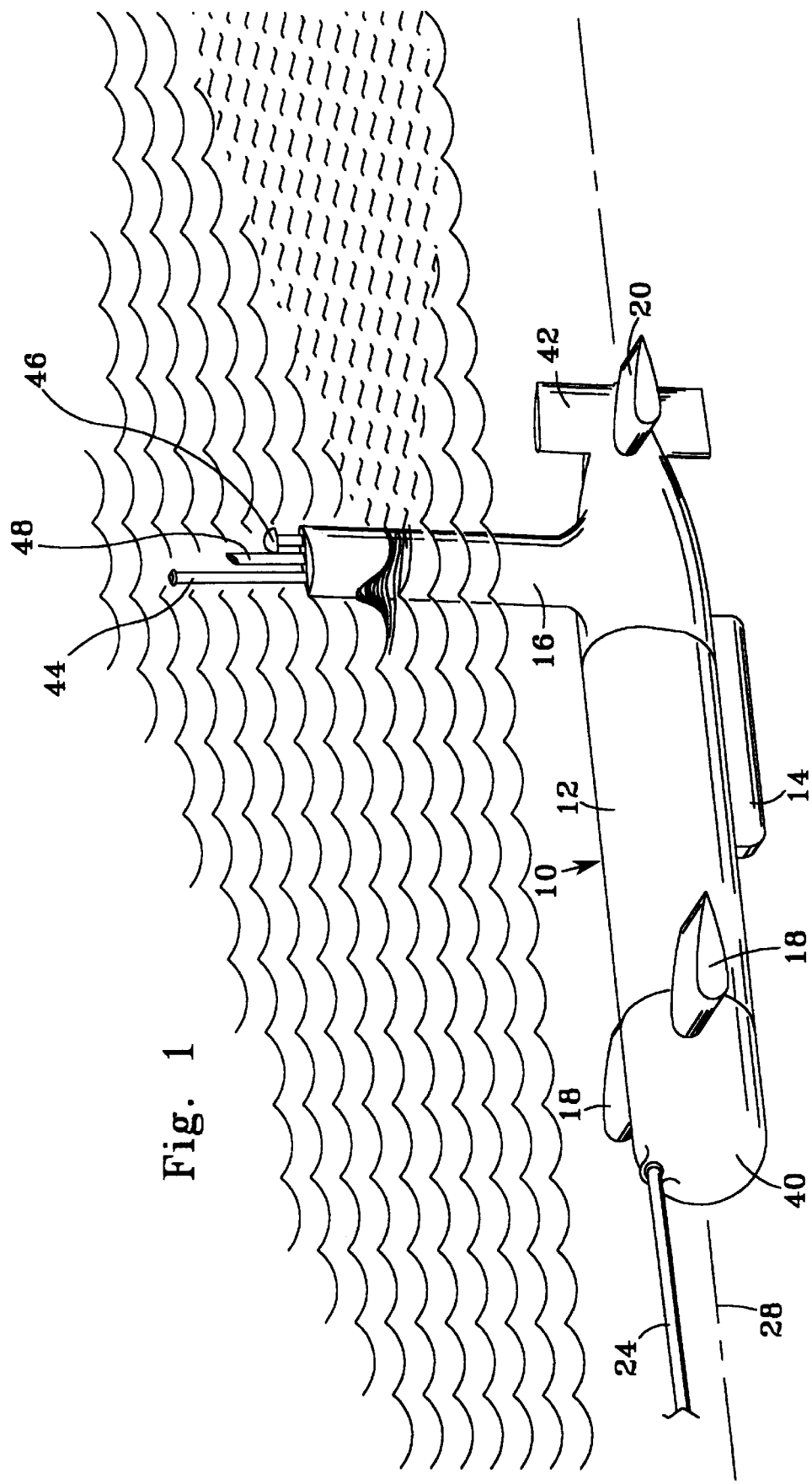

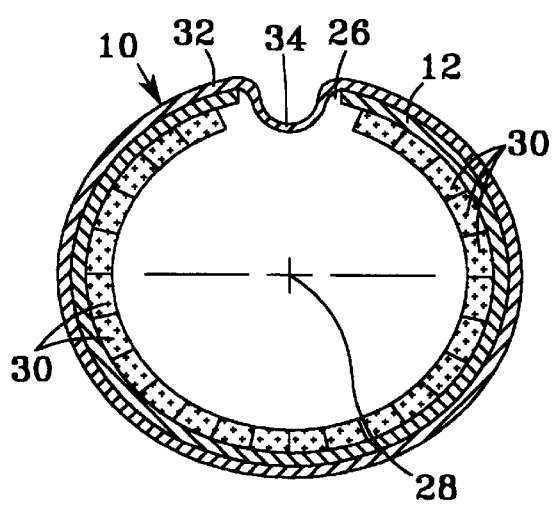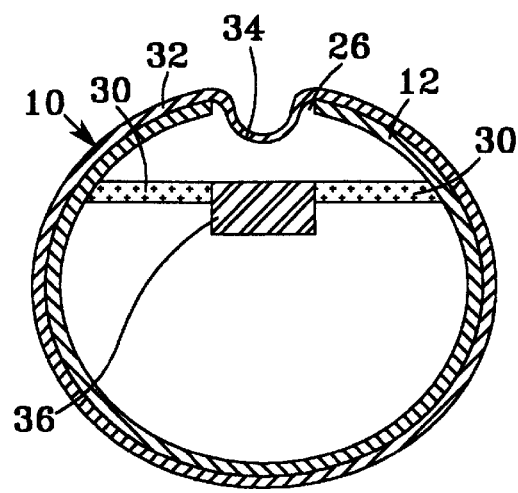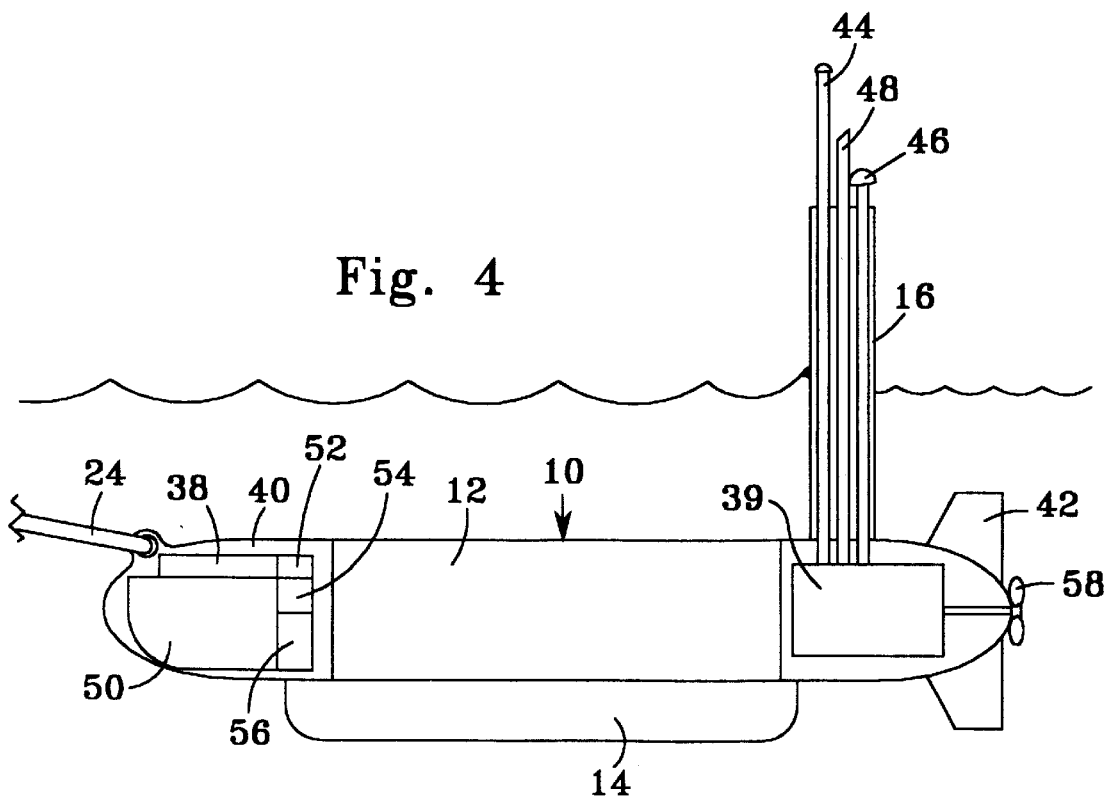

SLOTTED CYLINDER MARINE SIESMIC METHOD AND SOURCE

BACKGROUND OF THE INVENTION

The present invention relates to the field of seismic sources for marine geophysical operations. More particularly, the invention relates to an improved seismic source using piezoelectric elements within a slotted housing to generate seismic source energy.

Marine seismic vessels tow vibrators, air guns, explosives, and other acoustic projector techniques to generate seismic source energy in marine geophysical operations. The seismic source energy is represented by a pressure pulse in the water. The pressure pulse generated travels downwardly through the water and underlying geologic structures and is reflected from interfaces between the geologic structures. The reflected signal impulses return to the water column and are detected with sensors towed behind the seismic vessel or laid on the water bottom.

Seismic operations typically use high powered acoustic signals near 190 dB/Hz re micro Pascal in a low frequency band between 5–120 Hz. High power signals penetrate deep within subsurface geologic structures, and low frequency signals experience less attenuation than higher frequency signals.

High power, low frequency source signals for marine geophysical operations are typically generated with air guns or other acoustic sources. U.S. Pat. No. 3,896,889 to Bouyoucos (1975) disclosed a mass oscillation system for generating acoustic source energy in water. Other devices generate an acoustic signal by transmitting high velocity water jets into the underwater water environment. U.S. Pat. No. 4,131,178 to Bouyoucos (1978) and U.S. Pat. No. 4,153,135 to Bouyoucos (1979) disclosed a moveable piston for generating high velocity water jets. U.S. Pat. No. 4,234,052 to Chelminski (1980) disclosed another liquid jet acoustic source system. Improvements to liquid jet acoustic source systems were disclosed in U.S. Pat. No. 4,695,987 to Buoyoucos (1987) and U.S. Pat. No. 4,753,316 to Buoyoucos et al. (1988).

Another type of seismic source system releases compressed air through various mechanical firing systems into the water. U.S. Pat. No. 4,180,139 to Walker (1979) disclosed one type of air gun, and U.S. Pat. No. 4,285,415 to Paitson (1981) disclosed a mechanism for controlling the discharge of compressed air. U.S. Pat. No. 5,228,010 to Harrison (1993) disclosed a shuttle air gun for generating acoustic source energy.

Underwater acoustic vibrators have been used in submarine operations to detect and to locate the position of vessels and underwater objects, however such vibrators do not operate at the power levels and frequency necessary in seismic operations. An example of a high frequency, low power system is described in U.S. Pat. No. 3,875,552 to Hogman et al. (1975), wherein sonar signals were transmitted from a mobile, underwater target, and in U.S. Pat. No. 5,600,087 to Chace (1997), which described a programmable underwater vehicle. These acoustic vibrators are streamlined, neutrally buoyant, and have control systems for changing depth, course and speed. Although multiple units of such devices could be simultanesously towed to increase the amount of acoustic power generated, simultaneous deployment of multiple acoustic sources complicates deployment, synchronization, and operation.

In addition to the high frequency, low power electromechanical transducers described above for submarine operations, slotted transducers have been used in loud speakers and in underwater sonar applications. Proposed uses for such transducers include pile drivers, trench diggers, gravel packers, replaceable knives or drills or surgical blades, sonic tools in oil wells, and sonobuoy and sonar installations.

Various forms of electromechanical transducers have been developed. U.S. Pat. No. 4,220,887 to Kompanek (1980) described a slotted electromechanical transducer having a resilient member in the slot for prestressing the transducer and for preventing contact between adjacent transducer ends. U.S. Pat. No. 4,651,044 to Kompanek (1987) specifically attempted to produce large amounts of power at low frequency, however the frequency range was in the order of "several kilocycles". U.S. Pat. No. 5,122,992 to Kompanek (1992) disclosed a transducer member having a closure member extending in a U-shaped configuration. The length of the closure member defined the bandwidth of the vibration frequency produced. In U.S. Pat. No. 5,267,223 to Flanagan et al. (1993), a compliant cover was bonded to a transducer shell.

Conventional seismic source technology does not efficiently provide high power, low frequency source energy from a simple operating system. There is, accordingly, a need for an improved seismic source generator for use in marine seismic operations. The seismic source generator should produce high power output up to and exceeding 190 dB re micro Pascal at one meter and should operate in a frequency range between 5 and 120 Hz. The seismic source generator should be compact to facilitate deployment and retrieval.

SUMMARY OF THE INVENTION

The present invention provides an improved marine seismic method and system for geophysical exploration in water. The method comprises the steps of positioning a housing in the water, wherein the housing is moveable to generate a pressure pulse for creating a geophysical acoustic signal, and wherein the housing is engaged with a piezoelectric element operable to move the housing. The piezoelectric element is operated to move the housing to create the acoustic signal.

The invention also provides a marine seismic system for exploring geologic formations underlying water, wherein the system provides a housing deployable in the water which is moveable to generate a pressure pulse to create a geophysical acoustic signal, an electric power source for providing electric power, and a piezoelectric element engaged with the electric power source and with the housing for moving the housing when the electric power source provides electric power to the piezoelectric element to generate the pressure pulse.

BRIEF DESCRIPTION OF THE DRAWINGS

FIG. 1 illustrates an elevation view of a marine acoustic source.

FIG. 2 illustrates a sectional view showing piezoelectric elements attached to a housing interior wall.

FIG. 3 illustrates piezoelectric elements in a different configuration.

FIG. 4 illustrates a sectional view of a marine acoustic source.

DESCRIPTION OF THE PREFERRED EMBODIMENTS

The invention provides an improved seismic method and system for use in marine geophysical operations. Referring to FIG. 1, acoustic source apparatus 10 is illustrated as comprising housing 12, keel 14, and mast 16. Keel 14 can be releasable from housing 12 to facilitate emergency retrieval if housing exceeds a selected depth. Planes fore 18 and aft 20 can be engaged with housing 12 to provide for elevation control and stability as apparatus 10 moves through water 22. A related underwater vehicle is produced by Perry Technologies, a Lockheed Martin Company located in Riviera Beach, Fla. Line 24 can be attached to housing 12 and to a seismic vessel (not shown) for providing a tow cable and umbilical lines as described below.

Referring to FIG. 2, stress relief recess, slot, or slot portion such as slot 26 may be integrated along all or a portion of housing 12. Housing 12 can be cylindrical, circular, elliptical, or another shape, and can incorporate one or more slots 26 for permitting expansion of housing 12 or other movement sufficient to produce a pressure pulse. Apparatus 10 can be neutrally buoyant, powered or unpowered, controlled remotely or autonomously, and can be manueverable horizontally or vertically, or laterally in water 22.

Housing 12 can comprise a single component having slot 26 along a line parallel to the longitudinal axis 28 of housing 12. Housing 12 is moved to produce the desired vibration by activating piezoelectric element attached inside of housing 12. "Piezoelectric" refers to the generation of electric polarity in dielectric crystals subjected to mechanical stress, and the generation of stress in such crystals when subjected to an applied voltage. Piezoelectric element 30 can be formed from a single element or from a series or combination of piezoelectric elements 30 as shown in FIG. 2. As defined herein, references to a single piezoelectric element 30 means one or more elements. When an electric potential is applied to piezoelectric elements 30, such elements expand and force housing 12 to expand radially outwardly. Such radial expansion is facilitated by slot 26, and such radial expansion of housing 12 produces a pressure field or pulse in water 22. Such pressure pulse provides the seismic source energy sufficient for penetrating subsurface geologic formations to provide useful seismic data.

Flexible seal 32 or another type of connector bridges slot 26. Seal 32 may comprise any suitable sealing material including rubber, synthetic cloth, plastic, composites, and spring steel, and provides for flexural movement of housing 12. Although seal 32 does not require fluid tight capabilities, seal 32 preferably encloses the interior of housing 12 to prevent fluid intrusion within the interior of housing 12. Seal 32 is shown in FIG. 2 as wrapping completely around housing 12 circumference, however seal 32 could also be limited to the area proximate to slot 26. Seal 32 includes fold 34 to permit elastic, radial expansion and contraction of housing 12 without mechanically stressing seal 32.

Although piezoelectric element 30 is shown as having a relatively uniform thickness, piezoelectric element 30 can be constructed in many different shapes and combinations to accomplish a design objective. In other embodiments of the invention as shown in FIG. 3, a combination of piezoelectric elements 30 can be positioned within housing 12 to magnify the movement of housing 12 following actuation of piezoelectric elements 30. The form and construction of such combination can be altered to accomplish different design objectives.

Referring to FIG. 4, movement of housing 12 can be controlled with remote or on-board controller 38 for controlling roll, pitch, yaw, and deployment depth of housing 12. Electric power can be provided from on board electric generator 39. For a towed housing 12, line 24 can be attached as shown in FIG. 1 and can include electrical, hydraulic, or compressed air umbilicals for providing electricity, hydraulic power, and compressed air to housing 12. Line 24 can provide power for on-board hydrodynamic control electronics, for control surface actuators, for acoustic actuators, and for other instrumentation.

Housing 12 can have rounded-nose end cap 40 and rudder 42 or other control mechanism for providing steering control. Mast 16 can incorporate command and control communications antenna 44 and global positioning satellite ("GPS") antenna 46. Mast 16 can be articulated to facilitate deployment, retrieval and storage. Mast 16 provides a stationary platform for satellite navigation through GPS antenna 46. Rescue beacon 48 is mounted on mast 16 to facilitate retrieval operations if housing 12 is separated from the seismic vessel or communication power is otherwise lost. In different embodiments of the invention, other components can include fuel tank 50, radio modem 52, navigation electronics 54, and vibrator control 56. For a self powered system, generator 39 can be engaged with propeller 58 for forward movement.

To produce high power acoustic pressure at low frequencies, an acoustic projector such as apparatus 10 must have a large surface area displaced over a relatively large distance. If the acoustic projector is small relative to the signal wavelength produced, the following source equation models a simple source as a sphere having the same surface area as the model acoustic projector. This formula relates the acoustic pressure displaced to the area, frequency and displacement of the projector surface.

$$\text{pressure } (p) = \frac{\pi \rho f^2 A d}{r}$$

ρ=density
f=frequency
A=projector area
d=area displacement
r=observation distance Morse and Ingard, *Theoretical Acoustics* (1968). For a single submerged marine vibrator to produce high-pressure, low-frequency acoustic signals, the surface area of the projector should be large and the driving actuator should be powerful.

Although housing 12 can be tethered to the seismic tow vessel 10, housing 12 could operated as an untethered, remotely controlled system having internal power, control, and signal generation capabilities (not shown). Control of speed, direction, and depth can be remotely controlled from a seismic vessel, from land based facilities, or by preprogrammed code. For example, housing 12 can navigate from one location to another by following a preprogrammed course and speed stored in navigation system memory. Such navigation system can be capable of detecting potential collision with fixed or mobile objects and of autonomously initiating manuevers to avoid collusion. The position of housing 12 can be determined and transmitted through a radio network, GPS satellites, acoustic beacons, or other techniques.

The present invention uniquely provides an efficient acoustic energy method and source which can be highly controlled to provide seismic source energy in marine geophysical operations. Apparatus 10 is preferably sized to provide acoustic signals of at least 190 dB/Hz re micro Pascal, and in a frequency range less than than 120 Hz. In a preferred embodiment of the invention, apparatus 10 generates acoustic signals in a frequency range between 5 and 120 Hz. The invention permits near point source generation of acoustic source energy, instead of using multiple air guns scattered over the width of a towed seismic array. Autonomous locomotive control of housing 12 provides for movement independent from apparatus 10, thereby increasing the flexibility of providing seismic source energy at different positions relative to the support vessel.

The invention provides numerous advantages over prior art marine seismic source techniques, and provides superior signal control from a single element instead of the multistring, multi-gun arrays conventionally used. By providing for solid state actuation of piezoelectric element 30 and elastic amplification of housing 12, the mechanical and electrical simplicity of the invention provides superior performance when compared with conventional systems having complex mechanical components subject to wear, tuning requirements, and complex electrical interfaces. The cost of the invention is significantly less than conventional seismic sources, and the total cost of operation is reduced because of lower drag in water 22 and the increased efficiency over conventional air gun systems. The compact size of the invention reduces deck space required on vessels, and control over the source energy reduces negative impact on marine life. The selectivity over the frequency content and power of the source energy offers significant data processing capabilities not available with conventional systems, and the invention offers the potential for simultaneous, orthogonal pseudo-random sweeps to facilitate increased coverage rate or spatial sampling.

The method of the invention is practiced by selectively operating piezoelectric element or elements 30 with electricity provided by an integrated or remote power source. Movement of piezoelectric element 30 moves housing 12 to generated the acoustic source energy in a low frequency range at a high power level. The reliance upon a simple elastic system in the form of a movable housing substantially eliminates frictional wear, mechanical wear, and abrasion between the operable parts. The invention provides an easily towable, reduced friction, dependable seismic energy source. Housing 12 can be towed through the water or can function as a separate device moving independently of the vessel. The position of housing 12 can be identified and recorded by GPS or other positioning equipment, and by a controller located in the water, on board the vessel, or at land based processing facilities.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. A method for generating geophysical source energy to explore geologic formations underlying water, comprising the steps of:

positioning a slotted housing in the water, wherein said housing is moveable relative to said housing slot to generate a pressure pulse for creating a geophysical acoustic signal, and wherein said housing is engaged with a piezoelectric element operable to move said housing; and operating said piezoelectric element to move said housing to create said acoustic signal.

2. A method as recited in claim 1, wherein said acoustic signal exceeds 190 dB/Hz re micro Pascal.

3. A method as recited in claim 1, wherein said acoustic signal has a frequency less than 120 Hz.

4. A method as recited in claim 1, wherein said acoustic signal has a frequency in the range between 5 and 120 Hz.

5. A method as recited in claim 1, further comprising the steps of towing said housing through the water with a seismic vessel and of operating said piezoelectric element with electric power provided from an electric power source attached to the seismic vessel.

6. A method as recited in claim 1, further comprising the step of identifying the geographic position of said housing when said acoustic signal is generated.

7. A method as recited in claim 6, further comprising the step of operating a controller to record information regarding said housing location and time that said acoustic signal was generated.

8. A method as recited in claim 1, further comprising the step of operating a receiver to detect seismic signals comprising said acoustic signal reflected by the geologic formations.

9. A marine seismic system for exploring geologic formations underlying water, comprising:

a slotted housing deployable in the water which is moveable to generate a pressure pulse to create a geophysical acoustic signal;

an electric power source for providing electric power; and a piezoelectric element engaged with said electric power source and with said housing for moving said housing relative to said housing slot, when said electric power source provides electric power to said piezoelectric element, to generate said pressure pulse.

10. A system as recited in claim 9, further comprising a controller for recording information regarding said housing location and time that said piezoelectric element and said housing generate said pressure pulse and acoustic signal.

11. A system as recited in claim 10, further comprising a receiver for detecting seismic signals comprising said acoustic signal reflected by the geologic formations and for transmitting to said controller a data signal representing said seismic signals.

12. An apparatus as recited in claim 7, further comprising a plurality of piezoelectric components engaged with said power source for moving said housing.

13. A system as recited in claim 9, further comprising a vessel for towing said housing through the water.

14. A system as recited in claim 9, further comprising a vessel for deploying said housing, and wherein said housing is movable in the water independently of said vessel.

15. A system as recited in claim 11, wherein said piezoelectric element and said housing are capable of producing acoustic signals greater than 190 dB/Hz re micro Pascal.

16. A system as recited in claim 9, wherein said piezoelectric element and said housing are capable of producing acoustic signals in a frequency range less than 120 Hz.

17. A system as recited in claim 9, wherein said piezoelectric element and said housing are capable of producing acoustic signals in a frequency range between 5 and 120 Hz.

* * * * *

UNITED STATES PATENT AND TRADEMARK OFFICE
CERTIFICATE OF CORRECTION

PATENT NO. : 6,002,648
DATED : Dec. 14, 1999
INVENTOR(S) : Loran D. Ambs

It is certified that error appears in the above-indentified patent and that said Letters Patent is hereby corrected as shown below:

on the title page, item [54] and Column 1:
    In the Title, fourth word, delete " SIESMIC " and insert:

-- SEISMIC --

Signed and Sealed this

Twenty-seventh Day of March, 2001

NICHOLAS P. GODICI

*Attest:*

*Attesting Officer*    *Acting Director of the United States Patent and Trademark Office*